March 31, 1959 C. O. LINDSETH 2,880,378

SHAPED PROCESSED CIRCUITRY

Filed July 30, 1954

INVENTOR.
CLINTON O. LINDSETH
BY
R. I. Tompkins
ATTORNEYS

United States Patent Office 2,880,378

Patented Mar. 31, 1959

2,880,378

SHAPED PROCESSED CIRCUITRY

Clinton O. Lindseth, Silva, N. Dak., assignor to the United States of America as represented by the Secretary of the Navy Application July 30, 1954, Serial No. 446,981

2 Claims. (Cl. 317—101)

(Granted under Title 35, U. S. Code (1952), sec. 266)

The invention described herein may be manufactured and used by or for the Government of the United States of America for governmental purposes without the payment of any royalties thereon or therefor.

The present invention relates to shaped processed circuitry and more particularly to three-dimensional processed circuitry providing a maximum surface area for mounting electrical components.

Processed circuitry has proven very useful in certain electronic devices where the space requirements of the common planar processed circuitry could be economically met. However, in other devices such as radar sets where only a limited space is available, processed circuitry has not been adaptable to wide spread use because of its planar form. The problems involved in utilizing processed circuitry in airborne radar sets where space is at a premium have heretofore ruled against its use since it has often been unfeasible or impossible to fit the planar processed circuitry into the oftentimes irregular space available. The present invention is directed toward the solution of the problems encountered in utilizing processed circuitry in radar sets by providing three-dimensional processed circuitry which is formed to fit and make maximum use of the space available in such sets.

An object of the present invention is the provision of shaped processed circuitry which is formed to make maximum use of space available in electronic units.

Another object is the provision of shaped processed circuitry which provides additional surface for the mounting of electrical components.

An additional object is to provide compact three-dimensional processed circuitry shaped to fit available space in miniature radar sets.

A further object is the provision of compact shaped processed circuitry which enables the maximum number of electrical components to be mounted in available space in an electronic unit.

Other objects and many of the attendant advantages of this invention will be readily appreciated as the same becomes better understood by reference to the following detailed description when considered in conjunction with the accompanying drawings wherein.

Figure 1:
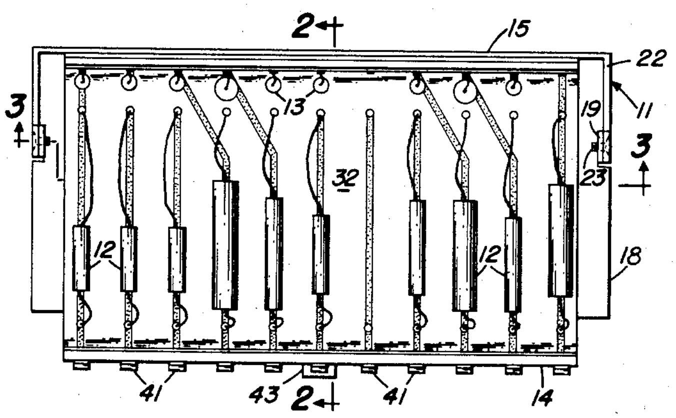
Fig. 1 is a bottom view of a preferred embodiment of the invention.
Figure 2:
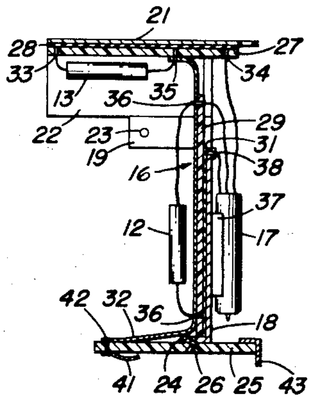
Fig. 2 is a sectional view taken on the line 2—2 of Fig. 1 showing the embodiment of Fig. 1 in cross section.
Figure 3:
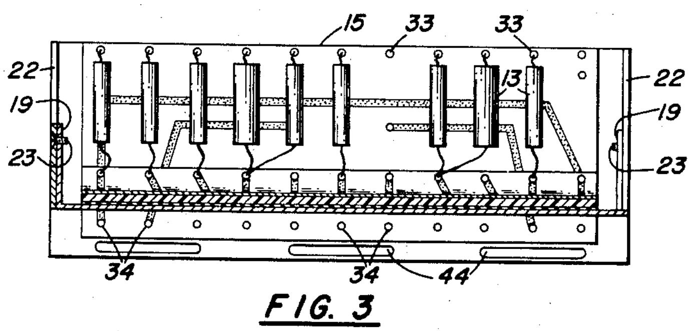
Fig. 3 is a sectional view taken on the line 3—3 of Fig. 1.

Referring more particularly to the drawing, the processed circuitry illustrated in Fig. 1 provides a support or chassis 11 for a number of electrical components 12 and 13, such as resistors, capacitors, inductors, tubes, and etc. The support 11 includes side walls 14 and 15 joined by a central member 16 as shown in Fig. 2. The vertically positioned components 13 are mounted on the inner surface of the wall 15 and the horizontally positioned components 12 are mounted on the lower surface of the central member 16. In addition, a plurality of sub-miniature tubes 17 are mounted on the upper surface of the central member. The support in the embodiment of Fig. 2, includes a rigid backing structure made up of interconnected metallic plates and a relatively heavy panel of insulating material. As shown in Figs. 1 and 3, the plate 18 is provided at opposite ends with ears 19, 19 extending downwardly therefrom at right angles, and the opposite ends of plate 21 are bent inwardly normal to the remainder of the plate forming flanges 22, 22. The ears and flanges overlap and are secured together by screws 23. A down-turned lip 24 is formed along the edge of plate 18 away from plate 21 and is attached to panel 25 by means of screws 26. The panel 25 and plates 18 and 21 are thus combined to form a backing structure for the various processed panels and lend strength and rigidity to the support or chassis. The processed panels and sheets hereinafter referred to consist of pieces of insulating material upon which metallic circuitry has been adhered. As shown in Fig. 2, processed panel 27 and insulating panel 28 are mounted on plate 21 by screws (not shown). The processed panel 27 is provided with circuitry on both its inner and outer surfaces, the circuitry on the outer surface being shielded from plate 21 by insulating panel 28 to prevent shorting. The processed panel 29 is provided with circuitry on its upper surface and is mounted on plate 18 with insulating panel 31 therebetween. Additional circuitry may be applied to the lower surface of plate 29 if desired. A flexible processed sheet 32 is provided with circuitry on its inner surface and is attached to the inner surfaces of panels 25, 29 and 27. The circuitry on the outer surface of panel 27 is connected with the inner surface of the panel by means of eyelets 33 and 34, and the circuitry on sheet 32 is connected to the circuitry on the outer surface of panel 27 and on panel 29 by eyelets 35 and 36 respectively. The components 13 are mounted on wall 15 by means of their leads soldered into eyelets 33 and 35, and components 12 are mounted on the central member 16 in a similar manner with their leads soldered into eyelets 36. The sub-miniature tubes 17 are retained in spring clips 37 mounted on plate 18 and are connected to the desired circuitry by leads soldered into eyelets 34 and 36 and to bus bar 38 mounted on plate 18. The patterns of the interconnected circuitry shown in Figs. 1 and 3 are illustrative only of the manner in which the circuitry is connected and it is understood that the actual circuit patterns may be different than as shown.

Figure 4:
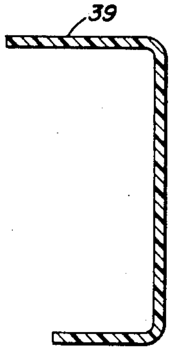
Fig. 4 is a view similar to Fig. 2 showing a cross section of another embodiment of the invention.

In some instances it may be desirable to form the support from a single section bent to the proper shape as is shown in Fig. 4. In such case, metallic circuitry is applied to both surfaces of a panel 39 while it is in planar form and it is then shaped under heat and pressure to the desired form.

As shown in Figs. 1 and 2, the circuitry on sheet 32 is arranged in strips connected at one end to spring finger contacts 41 by means of eyelets 42. The support, alone or in conjunction with other similar units, is adapted to be received within the chassis of an electronic device which has a plurality of contact strips connected to a source of power. As the support is inserted in the above-mentioned chassis, the fingers 41 slide along the contact strips, thereby energizing the various components on the support. The support is held from slipping out of place in the chassis by means of projection 43 which contacts the edge of the space into which the support is inserted. The openings 44 in the upper end of plate 21 provide a means for circulating cooling air over the sub-miniature tubes 17.

The processed panels are formed of an insulating material which may be thick enough so that they are quite rigid or it may be sufficiently thin as to leave the entire panel flexible. Examples of materials suitable for use in the sheets and panels are glass fabric or fiber glass bonded with silicone resin, phenolic resin or Teflon, however other materials exhibiting similar properties would be equally suitable. The metallic circuitry applied to the processed panels may be obtained in a number of ways. One method is adhering a solid sheet of metal to a panel, then etching away the undesired metal leaving only the desired pattern of metallic conductors. Other methods which may be employed are: printing of the desired circuitry patterns by silk screen techniques; impressing metallic powder or sheets into the surface of the panel by means of dies; and plating. The plating process is preferred since the eyelets can be installed and then the conductors plated into them or the eyelets can be omitted and the conductors plated through holes in the panel. Other methods require processing of the circuitry and then installation of the eyelets followed by soldering of the eyelets to the conductors to assure dependable electrical contact. The circuitry itself is formed of silver, silver plated copper or aluminum. Silver plated copper is preferred to copper alone since silver provides better conductivity and greater resistance to corrosion, and also silver oxide is a conductor while copper oxide is a resistor.

Obviously many modifications and variations of the present invention are possible in the light of the above teachings. It is therefore to be understood that within the scope of the appended claims the invention may be practiced otherwise than as specifically described.

What is claimed is:

1. For use in miniature radar sets, a unit comprising a channel shaped backing structure having a central portion and long and short side walls, a thin sheet of insulating material bearing processed circuitry attached to the inner surfaces of said structure, and a plurality of electrical components positioned on the inner surface of the long side wall in parallel rows placed transverse to the longitudinal axis of said wall, a plurality of electrical components positioned on both the inner and outer surfaces of the central portion in parallel rows arranged transverse to the longitudinal axis of said portion, and spring contacts located at the outer edge of the short side wall connected to said circuitry for energizing the components.

2. A support for electrical components comprising a three-dimensional backing structure having a central portion and long and short side walls, and a thin sheet of flexible insulating material bearing processed circuitry covering the inner surfaces of said structure, a plurality of electrical components positioned on the inner surface of the long side wall in parallel rows arranged transverse to the longitudinal axis of said wall, a plurality of electrical components positioned on the inner surface of the central portion in parallel rows arranged transverse to the longitudinal axis of said portion, a plurality of electron emitting devices positioned on the outer surface of the central portion in parallel rows arranged transverse to the longitudinal axis of said portion, and spring contacts located at the outer edge of the short side wall connected to said circuitry for energizing the components.

References Cited in the file of this patent

UNITED STATES PATENTS

| | | |
|---|---|---|
| 1,892,146 | Harshberger | Dec. 27, 1932 |
| 2,076,771 | Eastman et al. | Apr. 13, 1937 |
| 2,244,009 | Hiensch | June 3, 1041 |
| 2,474,988 | Sargrove | July 5, 1949 |
| 2,508,030 | Karns | May 16, 1950 |
| 2,599,710 | Hathaway | June 10, 1952 |
| 2,641,635 | Scal | June 9, 1953 |